April 28, 1959  R. A. HAAS  2,883,750
DENTURE TONGS
Filed April 22, 1957
Fig. 2
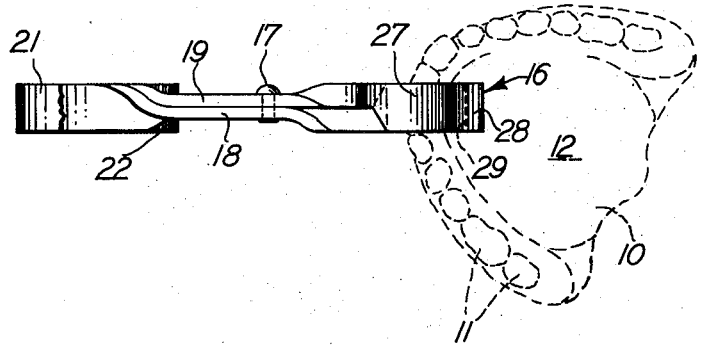
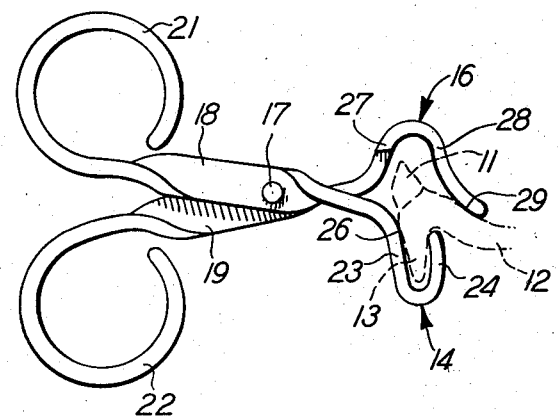
Fig. 1
INVENTOR:
ROBERT A. HAAS
BY: *Arthur J. Hansmann*
ATTORNEY United States Patent Office 2,883,750
Patented Apr. 28, 1959

2,883,750
DENTURE TONGS
Robert A. Haas, Racine, Wis.
Application April 22, 1957, Serial No. 654,235
3 Claims. (Cl. 32—68)

This invention relates to tongs for holding an artificial denture while cleaning the same.

It is an object of this invention to provide tongs for holding an artificial denture while the same is cleaned under the water faucet, and it is particularly intended to provide a means for securely holding the denture so it cannot drop into the sink and chip the brittle teeth or gum portion of the denture.

It is another object of this invention to provide denture tongs for the purpose mentioned and wherein the tongs securely hold the denture against movement in any direction with respect to the tongs although the teeth of the denture are not in any way touched by the tongs.

Still another object of this invention is to provide a simple and inexpensive denture tong to be used for holding a denture while cleaning the same and with the tong covering only a minimum portion of the denture so that practically the entire denture is exposed for cleaning.

Other objects and advantages will become apparent upon reading the following description in light of the accompanying drawings, wherein:

Fig. 1 is a side elevational view of a preferred embodiment of the tongs of this invention and showing the tongs holding a denture plate fragmentarily shown.

Fig. 2 is a top plan view of the tongs shown in Fig. 1 with parts broken away and showing in dotted lines a full denture plate.

Similar reference numerals refer to similar parts between the two views.

The drawings show a denture plate 10 in dotted lines with the usual teeth 11 embedded in the gum portion of the plate 10. The gum portion is shown in Fig. 1 to include the usual gum base portion 12 and the peripheral gum flange portion 13. Fig. 1 further shows the tongs to consist of a first jaw portion 14 and a second jaw portion 16 which are joined together by a pivot pin 17. The jaw portions mentioned are integral with their respective shanks 18 and 19 which terminate in finger-receiving loops 21 and 22, respectively. From this portion of the description, it will, of course, be understood that the user's fingers are inserted in the loop portions 21 and 22, and the tongs have a scissor action such that the jaws 14 and 16 pivot about the pin 17 to either clamp onto the denture 10 or release the denture as desired.

An important feature of this construction is apparent in Fig. 1 in that the jaws of the tongs do not contact any of the teeth 11 but, nevertheless, the jaws hold the plate in a firm position such that the plate cannot rock or move with respect to the tong jaws. Thus, the first jaw portion 14 is bifurcated to include a leg 23 and a leg 24 spaced apart and of a length to receive the flange 13 of the plate gum such that the leg 23 contacts the gum at the line indicated by numeral 26. The tong jaw 16 is also shown to be bifurcated, and it includes a leg 27 and a leg 28 which are also spaced apart and of a length to clear the teeth 11 so that the tongs do not contact the teeth. In this instance, the leg 28 is reversely curved from the arrowhead of the numeral 16 to the free end of the leg 28 which is thus flared outwardly to contact the gum portion 12 at the line of contact indicated 29, and it will be noted that the contact lines 26 and 29 lie on an intersecting line which is oblique to the longitudinal axis of the tongs, and thus the tongs do not clamp in a true transverse direction with respect to its longitudinal axis. It should further be noted, as shown in Fig. 2, that the jaws 16 and 14 are of a substantial width as they contact the plate gum, and the lines 26 and 29 form said substantial width such that the plate 10 is not able to rotate or rock about a central axis transverse to the plane of the drawing paper.

To accomplish the features mentioned, the jaws 14 and 16 may be described as being of a design such that the jaw 14 falls substantially within the longitudinal limits of the jaw 16, as clearly shown in Fig. 1. With this arrangement, the user of the tongs cannot clamp the tongs onto a denture with such force that the denture could be injured since the jaws do not touch the teeth and the clamping force of the tong is not in the transverse plane of the tongs but rather at the oblique plane along a line lying on the lines 26 and 29.

While a specific embodiment of this invention has been shown and described, it should be understood that certain changes could be made in the embodiment, and the invention should, therefore, be limited only by the scope of the appended claims.

What is claimed is:

1. In tongs for holding an artificial denture of the type including a gum base portion and a peripheral gum flanged portion spaced from said gum base portion and projecting to one side thereof and said denture including teeth projecting from said gum base portion to the other side thereof, the tongs comprising a pair of jaws pivotally attached together for movement toward and away from each other, one of said jaws including two spaced apart legs for receiving said gum flanged portion with one of said legs on the outer side of and in contact with said gum flanged portion, and the other of said jaws including two spaced apart legs for spanning over said teeth of said denture and contacting only said gum base portion while being entirely spaced from said teeth, said one of said legs and said other of said jaws being disposed to clamp said denture therebetween upon pivotal movement of said jaws toward each other.

2. Tongs for holding an artificial denture while cleaning the denture which consists of a gum flange on one side thereof and teeth projecting to the other side thereof, comprising a first jaw including a flared leg portion disposed to be entirely spaced from said teeth and to contact said denture behind said teeth, a second jaw pivotally attached to said first jaw and including two leg portions for snugly receiving said gum flange with one of said leg portions being disposed to contact the denture front surface of said gum flange for clamping said denture with and against said flared leg of said first jaw.

3. Tongs for holding an artificial denture while cleaning the denture which consists of a gum flange on one side thereof and teeth projecting to the other side thereof, comprising a first jaw including a reversely curved jaw leg shaped for said leg to define an opening and to be entirely spaced from said teeth in one portion of said leg and for contacting said denture only behind said teeth in a free end defining the other portion of said leg, and a second jaw pivotally attached to said first jaw and terminating within the extent of said free end of said first jaw and having an opening faced toward said first-mentioned opening for receiving said gum flange.

References Cited in the file of this patent
UNITED STATES PATENTS
2,754,591    Schweizer _____ July 17, 1956